United States Patent [19]

Wright et al.

[11] Patent Number: 4,639,229
[45] Date of Patent: Jan. 27, 1987

[54] SURVIVAL KIT AIR DEPLOYABLE APPARATUS AND METHOD

[75] Inventors: David A. Wright; David B. Webb, both of Fort Erie, Canada

[73] Assignee: Her Majesty the Queen in right of Canada, Canada

[21] Appl. No.: 703,530

[22] Filed: Feb. 20, 1985

[30] Foreign Application Priority Data

Apr. 5, 1984 [CA] Canada ................................. 451376

[51] Int. Cl.$^4$ ................................................ B63C 9/04
[52] U.S. Cl. ..................................... 441/42; 206/223; 244/149; 441/83
[58] Field of Search ........................ 441/80, 83, 40–42, 441/32, 33; 244/138 R, 147, 149, 150; 206/223

[56] References Cited

U.S. PATENT DOCUMENTS

| | | | |
|---|---|---|---|
| 2,095,974 | 10/1937 | Finch | 441/42 |
| 2,114,301 | 4/1938 | Harrigan | 441/42 |
| 2,501,559 | 3/1950 | Winzen et al. | 244/150 X |
| 3,258,230 | 6/1966 | Bollinger et al. | 244/138 R |
| 4,362,517 | 12/1982 | Martin | 441/42 X |

*Primary Examiner*—Sherman D. Basinger
*Attorney, Agent, or Firm*—Stevens, Davis, Miller & Mosher

[57] ABSTRACT

An apparatus and method for airplane deployment over water of survival kit apparatus is provided. A pair of deflated, inflatable rafts are contained in a rigid container shell having a removable tail cone. A stabilizer drogue may be used to longitudinally stabilize the container prior to tail cone release and assist with the tail cone removal after release. The tail cone is mechanically released and removed from the container shell at a predetermined time after deployment from an aircraft, thereby permitting the container shell contents to be removed. The life rafts are contained in the container shell so that one life raft having associated with it an aerodynamic brake is released after the tail cone has been removed, with the container and second life raft continuing their trajectory downwards. The rope joining the two life rafts is continuously payed out as the first left raft falls to the water and the container with the second life raft therein continues its trajectory. The second life raft is removed from the container shell mechanically after the container shell contacts the surface of the water. The apparatus and method of the invention results in the pair of inflated rope-joined life rafts being deployed on the water surface at spaced locations.

20 Claims, 9 Drawing Figures

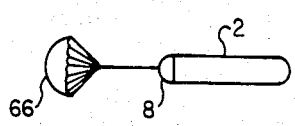
FIG. 3a
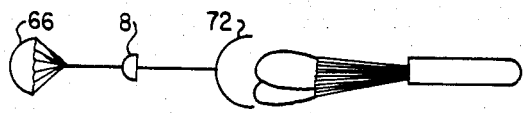
FIG. 3b
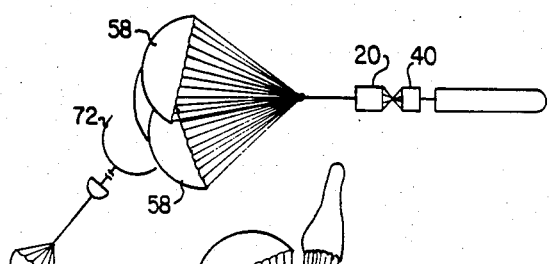
FIG. 3c
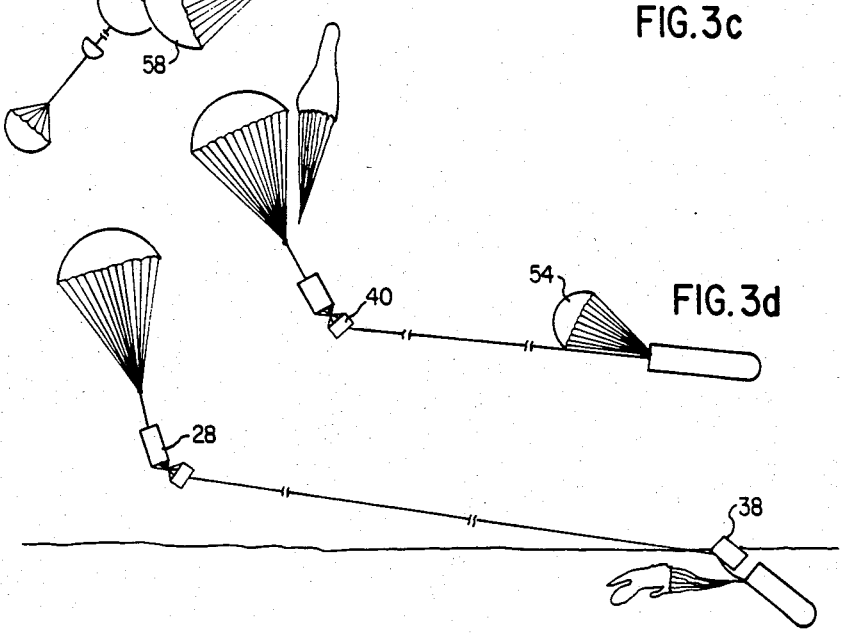
FIG. 3d
FIG. 3e
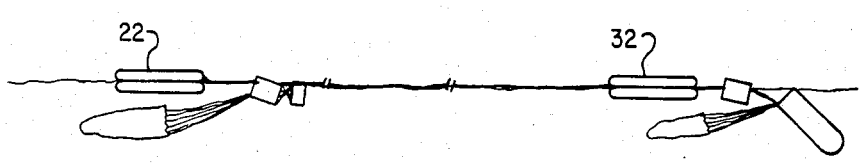
FIG. 3f

SURVIVAL KIT AIR DEPLOYABLE APPARATUS AND METHOD

The present invention relates to an air deployable survival kit apparatus and method of aerial deployment of survival kits and more particularly relates to a method and apparatus for dropping, by air, over-water, a pair of life rafts joined by a length of buoyant rope so that they will end up in spaced locations on the surface of the water with the buoyant rope sweeping the area between the rafts (if drifting) or providing a larger contact line for endangered personnel in the water.

BACKGROUND OF THE INVENTION

There has been a continuing need for development of methods of accurately dropping life rafts and other survival materials from an airplane to survivors in the water. In sea rescues, one method has been to drop a pair of life rafts joined by a rope. The survivors may climb into one of the life rafts if it lands near them, or alternatively they may pull themselves toward the life raft (or vice versa) using the rope joining the life rafts, if that rope lands near them. One of the problems of such a rescue apparatus has been to deploy it effectively by air. Problems with accuracy of dropping the rafts, proper spacing of the rafts in the water, the length of the rope tangling during the drop and deployment mechanisms for the rafts from the aircraft have been encountered. In some instances, such life raft systems have been actually pushed from an open window or door of an airplane flying over the survivors. In other instances, packages containing the rafts and survival kits have been held on platforms at the rear of the airplane and the life rafts individually mechanically pushed off the platform at timed intervals.

There is an increasing need for an air deployable survival kit apparatus and method, which can be used for example with long range coastal patrol airplanes, which can be entirely mechanically and electronically deployed. It is inconvenient or impossible to outfit many modern day airplanes with platforms to carry and permit deployment of lift rafts and the like. As well, many modern day airplanes do not have cockpit windows or doors which will open, being pressurized and sealed against outside air during flight. It is an objective of the present invention to provide a reliable air deployable survival kit apparatus and method with accurate delivery. More particularly, it is an objective of the present invention to provide such an apparatus which may be deployed for example from the bomb bay of an airplane or from an external mounting underneath the airplane's wings or fuselage.

SUMMARY OF THE INVENTION

According to the present invention, there is provided an air deployable survival kit apparatus comprising an outer, rigid container shell having an aerodynamic design to enable it to be dropped from an airplane. The shell includes a hollow body, a nose cone secured thereto and a tail cone releasably secured thereto. The device further comprises means attached to the shell to release the tail cone from secured position on the body of the container shell after deployment. Individual survival kit elements are packaged within the shell body. The survival kit element packages are released through the tail cone end thereof when the tail cone has been released. The elements are, packaged within the shell body in a predetermined manner as follows: (a) a first survival kit package is provided comprising a first deflated, inflatable life raft, inflation means therefor actuable a predetermined time after the first survival kit package has left the shell body, package means releasably enveloping the life raft and inflation means and an aerodynamic brake means such as a parachute means secured to the package means to slow the vertical descent of the first survival kit package when it has left the shell body after air deployment of the survival kit apparatus, the first survival kit package being normally positioned within the shell body at its end adjacent the tail cone: (b) a second survival kit package comprising a second deflated, inflatable life raft, inflation means therefor actuable a predetermined time after the first survival kit package has left the shell body, and package means releasably enveloping the second life raft and inflation means, the second survival kit package being normally positioned within the shell body at its end near the nose cone: (c) a rope and drogue deployment package normally positioned within the shell body between the first and second survival kit packages, the rope deployment package comprising a coil of rope of predetermined length, uncoilable from one end, a package means releasably enveloping a major portion of the rope coil, the end of the rope from which the coil is uncoiled being secured to the second life raft and the other end of the rope being secured to the first life raft.

In a preferred embodiment, the apparatus further comprises a deflated, inflatable floatation means packaged in the shell body at the end adjacent the nose cone. The flotation means when inflated in operation expands toward the open, tail cone end of the shell body to push any contents remaining in shell body out of the shell.

According to the method of the present invention, a pair of rope-joined life rafts are dropped from an airplane to spaced positions on a body of water in the following steps. First, a hollow container which has a removable tail cone is dropped over the body of water from an airplane in a trajectory which has a major horizontal component. The container contains a pair of rope-joined, deflated, inflatable life rafts. The tail cone is removed and one of the life rafts is drawn from the container. The descent of this life raft is aerodynamically braked while the other life raft (still within the container) and the container continue their descent as the rope joining the two life rafts is paid out. The other life raft is then removed from the container. Finally the life rafts are inflated after they reach the water surface.

The apparatus and method according to the present invention permits the use of an airplane such as an Aurora (Trade Mark) for long range search and rescue missions. It may be outfitted with a survival kit apparatus according to the present invention in its bomb bay and released at say 500 feet altitude to place a pair of inflated life rafts, joined by a rope, in the vicinity of survivors in a body of water. The entire operation is mechanical in nature and proceeds automatically once the release mechanism for the container in the bomb bay has been activated.

BRIEF DESCRIPTION OF THE DRAWINGS

These and other objects and advantages of the invention will become apparent upon reading the following detailed description and upon referring to the drawings in which:

FIGS. 3a–f are a series of schematic the stages of operation of the apparatus of FIGS. 1 and 2 during its air deployment views showing sequentially.

Figure 1:
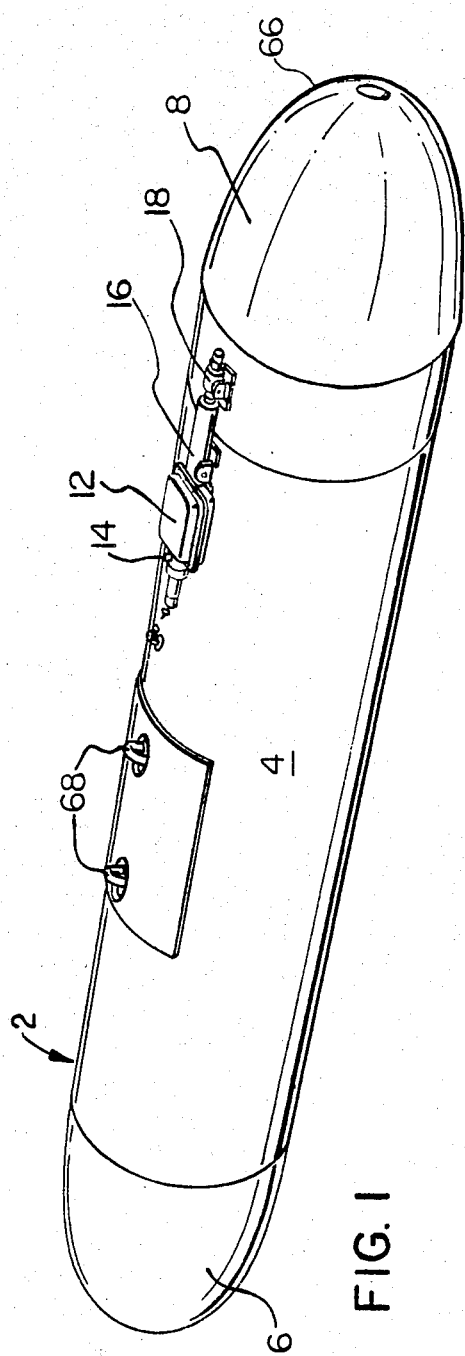
FIG. 1 is a perspective view of an air deployable survival kit apparatus according to the present invention.

While the invention will be described in conjunction with an example embodiment, it will be understood that it is not intended to limit the invention to such embodiment. On the contrary, it is intended to cover all alternatives, modifications and equivalents as may be included within the spirit and scope of the invention as defined by the appended claims.

DETAILED DESCRIPTION OF THE DRAWINGS

In the following description, similar features in the drawings have been given similar references numerals.

Figure 2:
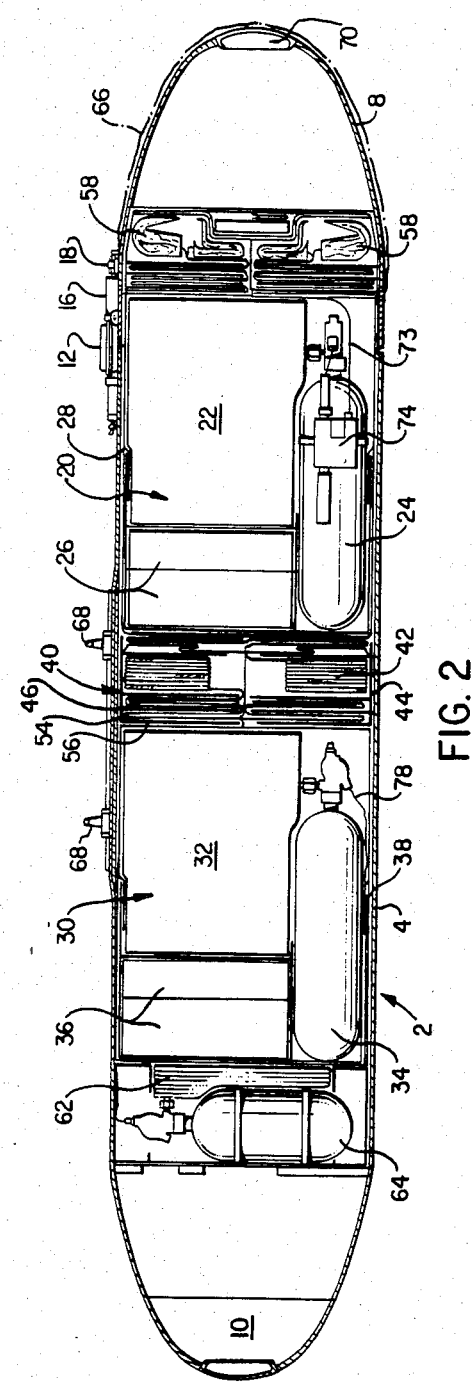
FIG. 2 is a section view of the apparatus of FIG. 1, from the side.

Turning now to FIGS. 1 and 2, there is shown an air-deployable survival kit apparatus according to the present invention comprising an outer, rigid container shell 2 having aerodynamic design and including a hollow body 4 of cylindrical shape and circular transverse cross-section, a nose cone 6 and a tail cone 8. Tail cone 8 is releasably secured to hollow body 4. Nose cone 6 contains ballast 10 to ensure that securing attachment loads on the container or aircraft are not exceeded by container moment reactions and to assist in assuring that when released from a horizontally flying plane, the apparatus will commence its trajectory oriented essentially horizontally, and follow its downward trajectory oriented more or less longitudinally in a direction which follows that trajectory.

Tail cone 8 is releasably secured to body 4 of the container shell 2 by means of a mechanical thruster unit 12 as described and illustrated in U.S. Pat. No. 4,572,011 of Donald B. Mauchlen issued Feb. 25, 1986. Mechanical thruster 12 enables the positive separation of tail cone 8 from hollow body 4 under a controlled time delay, the commencement of which time delay occurs when container shell 2 is launched from the delivery aircraft. (An initial stabilizing drogue may be used to assist this action.) Since actuation of the mechanical thruster's timing means commence when a pin 14 is pulled from it, the pulling of that pin 14 may be achieved for example by securing a lanyard or wire to the airplane frame and to the pin 14 so that, when the container shell 2 is launched, that pin 14 is pulled and removed from its seated position. The main portion of thruster body 12 is secured to body 4 as illustrated in FIG. 1 and its releasably thruster body 16 is secured to bracket 18 which in turn is secured to tail cone 8. Thus it will be understood that when the thruster mechanism is fired and thruster body 16 is thereby released from thruster body 12, tail cone 8 comes off leaving an opening at this end of shell body 4 for release of the contents of the shell.

Within container shell 2 are packaged the individual survival kit elements in a particular sequence and manner as illustrated in FIG. 2. In particular, these elements include a first survival kit package 20 comprising a deflated, inflatable life raft 22, a carbon dioxide canister 24, an emergency kit 26 (for example, containing food, clothing and first aid supplies), all of these items releasably contained within an appropriate packaging 28. Similarly, a second survival kit package 30 having another deflated, inflatable life raft 32, carbon dioxide canister 34 for inflating life raft 32, emergency kit 36 and packaging 38 for these items is provided. It will be noted that the first survival kit package 20 is located in container shell 2 at the tail cone end while second survival kit package 30 is located towards the nose cone end.

Figure 4:
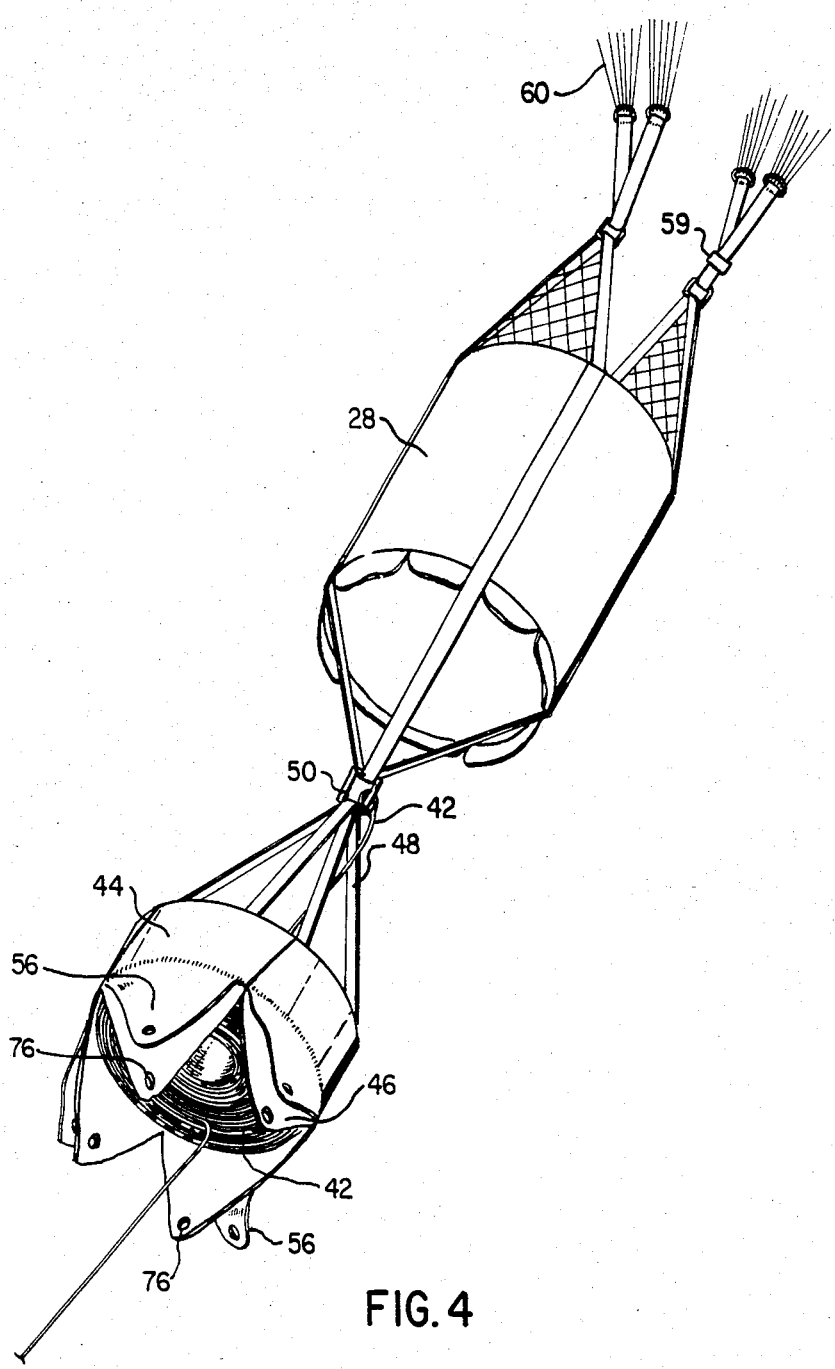
FIG. 4 is a perspective view of a portion of the apparatus, at an intermediate stage of deployment, illustrating the deployment of the rope joining the two life rafts during their descent.

Between the first and second survival kit packages in container shell 2 is located a rope deployment package 40 comprising a length of coiled rope 42 contained in a deployment bag 44. The rope is of any appropriate length (eg. 900 feet), and is coiled to enable its controlled paying out, in operation, uniformly as described in co-pending U.S. patent application Ser. No. 703528 now U.S. Pat. No. 4,593,815. The rope is coiled in layers with loops of increasing size in each layer, so that it will be payed out in layers from one side of the coil. In the illustrated embodiment, the coiling end of the rope is secured to life raft package 38 (see eg. FIG. 3e), and the other end to life raft package 28. As can be seen in FIG. 4, the deployment bag 44 is provided with flaps 46 releasably secured by a fold of stabilizer drogue vent lines (not shown) which pull loose when placed under tension in operation and act to free closed flaps 46 enabling them to open and expose coil 42 as illustrated, for paying out of the rope.

It will be seen in FIG. 4 that deployment bag 44 is linked, by webbing stringers 48, through link 50 to webbing stringers secured to packaging 28 of first survival kit package 20. This provides, as will be explained in detail subsequently, directional manoeuvrability for coiled rope 42 to facilitate its pay out.

Also contained in an adjacent section of deployment bag 44 is a drogue chute 54 (FIG. 2) which chute is releasably held between flaps 46 and flaps 56 spaced therefrom, these flaps 56 being releasably secured in closed position by a fold of stabilizer drogue suspension lines.

At the tail cone end of container shell 2, situated behind first survival kit package 20 are a pair of parachutes or canopies 58 secured to packaging 28 by appropriate risers 60 (FIG. 4).

Again referring to FIG. 2, towards the nose cone end of container shell 2 is positioned a deflated, inflatable ejection bag 62, fed by carbon dixode canister 64. Bag 62, when it inflates, provides buoyancy for container shell 2 and pushes any remaining contents within container shell 2 towards the tail cone end.

At the other end of container shell 2, covering a portion of tail cone 8 a stabilizing drogue chute 66 may be used. This chute is adapted to be opened when container shell 2 is released from the aircraft, to stabilize and orient the container shell as it commences its trajectory for a brief initial period prior to tail cone separation and to forcibly remove the tail cone after tail cone separation.

In operation, container 2 may be carried by an airplane while attached to appropriate attachment means such as, for example, standard bomb bay or wing pylon bomb racks by means of attachments 68. When released in flight, the components of the container shell are arranged so that a sequence of events is automatically initiated which results in the delivery of a pair of inflated, rope-connected life rafts to spaced locations on the surface of the water over which the container shell 2 is dropped. This sequence is illustrated schematically in FIGS. 3a to FIGS. 3f, as follows.

Upon release or launching from the airplane, the wire or lanyard connection between thruster pin 14 and the frame of the airplane causes pin 14 to be released, actuating thruster mechanism 12. The timing device of the unit is set to fire for example 0.8 seconds after actuation.

As well, upon release of container shell 2 from the aircraft, a lanyard secured to the airplane frame may be used to release a restraining pin (not shown) freeing spring 70 in the tail cone 8 to push outwardly against drogue chute 66. This drogue chute 66 (if used) stabilizes container shell 2 in a horizontal position at the commencement of its trajectory downwards (FIG. 3a).

In the next stage, as shown in FIG. 3b, after thruster mechanism 12 has fired, releasing tail cone 8 and drogue chute 66 secured thereto, the tail cone end of body 4 is thereby opened and parachutes 58 are extracted. This may be done, for example, by storing parachutes 58 in container shell 2 in a releasable deployment bag 72 (FIG. 3b), which bag is secured to tail cone 8 and stripped off of the parachutes as tail cone 8 is removed by thruster mechanism 12. Deployment bag 72, stabilizing drogue chute 66 and tail cone 8 are completely detached from the rest of the system and fall away as shown in FIG. 3c. First survival kit package 20 is drawn from hollow body 4 on line stretch of parachutes 58 (FIG. 3c). In order to obtain maximum separation of the inflated life rafts in the water, it is necessary to reduce the forward momentum of the first of the life rafts to leave body 4 as quickly as possible while the other continues the planned trajectory path with controlled forward momentum. This effect is achieved by way of parachutes 58 which produce aerodynamic braking on first survival kit package 20 and drogue parachute 54 which stabilizes and controls the container body. The use of a pair of parachutes 58 stops the forward momentum of first survival kit package 20 quickly allowing the remainder of the apparatus to carry on along its planned trajectory to obtain the noted separation.

As it is desirable for first survival kit package 20 to fall as quickly as possible to the surface of the water, one of the parachutes 58 may be reefed and, in a preferred embodiment, one of the chutes is cut away after the braking stage illustrated in FIG. 3d. This is accomplished, for example, by the arming of an explosive cutter 59 (FIG. 4) using a lanyard tied to one of the lines of chutes 58, the lanyard arming the explosive cutter when it is placed under tension as chute line stretch is reached. As well, a lanyard 73 (FIG. 2) may be similarly used to arm a timer mechanism 74 (eg. a Mark 10B (Trade Mark) timing mechanism similar to that used on the mechanical thruster 12) for controlling the actuation of the inflation of raft 22 by canister 24. It has been found, for example, when the apparatus is dropped from an altitude of 500 feet over a body of water, a seven second delay between the time of arming device 74 and its activation of the carbon dioxide feed to inflate life raft 22 is appropriate.

As first survival kit package 20 is removed from body 4 of container shell 2 (FIG. 3c), so also is rope deployment package 40 containing rope 42, coiled for pay out, and associated drogue chute 54.

FIG. 3d shows one of the chutes 58 having been cut away. It will be understood that, at this point, the timing mechanism 74 has been actuated so that, once the seven second delay has passed, inflation of life raft 22 will commence. As well, at this stage, rope 42 is being payed out from the lowest layer of coils, as illustrated in FIG. 4. It will be appreciated from the nature of flaps 46 and 56 that they may be releasably secured in position (to encase rope 42 and stabilizer drogue 54 for example by utilizing conventional closure loops and line fold stowages- standard parachute technology), the line folds being removable from the closure loops for example by means of natural deployment in sequence of the drogue chute 54. Drogue chute 54, being secured to body 4, is dragged from its secured position within flaps 56 when these flaps are released, as container shell 2 continues forwardly and downwardly. As drogue chute 54 opens fully (FIG. 3d) another timing device, for example, of the Mark 10B (Trade Mark) type previously described, arms ejector bag canister 64 upon line stretch, for example, again by way of a lanyard secured to the drogue pack. Rope 42 continues to be payed out from deployment bag 44 as container shell 2 continues its trajectory to the water (FIG. 3c). When shell 2 hits the water, inflation bag 62 forces second survival kit package 30 out of hollow body 4, stretching lanyard 78 (FIG. 2) which in turn actuates the carbon dioxide cylinder operating head to release a charge of carbon dioxide to inflate life raft 32. The inflation of the raft frees it from its packaging 38. At this stage (FIG. 3f) the life rafts are inflated and spaced a reasonable distance apart in the water. It should be noted that the rafts retain their respective emergency kits by way of lanyards or the like.

In actual use, the container shell is preferably dropped by an aircraft, headed at 90 degrees to the wind direction, up-wind of the target, from an altitude between 200 feet and 500 feet above the water, at 170±10 KIAS. Raft separation distances vary proportionately with the altitude at aircraft release, i.e., 200 ft. AWL*—separation distance: 300 ft. approx.
500 ft. AWL*—separation distance: 600 ft. approx.
*=ABOVE WATER LEVEL The life rafts and kits and rope then drift downwind on the water surface towards the persons in distress, thus giving them the best opportunity of reaching the buoyant rope, and pulling themselves up to and on board the life rafts. Both life rafts are inflated automatically, as has been described previously, requiring no actuation by the distressed persons.

It will be understood that there are many modifications or variations which are to be considered as falling within the scope of the present invention. For example, it may be desirable to separate the main or drogue chutes in part or entirely after water contact so that wind or ocean currents will not keep the chutes full and interfere with equipment performance or availability. Additionally, while the invention has been described in conjunction with two rope-connected life rafts, it will be apparent to one skilled in the art that three and possibly more rope joined life rafts could be deployed from a single container shell in accordance with the present invention. Furthermore, while parachutes and drogue chutes have been used to stabilize and decelerate, other aerodynamic stabilizers or brake devices may alternatively or additionally be appropriate.

The apparatus and method according to the present invention, in tests which have been carried out, has provided a simple and highly reliable, unitized air delivery system for life rafts and associated sea survival equipment. The invention provides a method and apparatus which are immediately available for emergency use under varying and extreme environmental conditions. The system provides a reasonable probability of precise delivery of life rafts to endangered personnel in the water, by providing good trajectory control with maximum spread between rope-connected life rafts.

Thus, there has been provided in accordance with the invention an air deployable survival kit apparatus that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What is claimed:

1. An air deployable survival kit apparatus comprising:
   (a) an outer, rigid container shell having an aerodynamic design to enable its being dropped from an airplane, the shell including a hollow body, a nose cone secured thereto and a tail cone releasably secured thereto;
   (b) means attached to the shell to release the tail cone from secured position on the body of the container shell after deployment;
   (c) individual survival kit elements packaged within the shell to be released through the tail cone end thereof when opened, the elements being packaged within the shell body in a predetermined manner as follows:
      (i) a first survival kit package comprising a first deflated, inflatable life raft, inflation means therefor actuable a predetermined time after the first survival kit package has left the shell body, package means releasably enveloping the life raft and inflation means and an aerodynamic brake means secured to the package means to slow the vertical descent of the first survival kit package when it has left the shell body after air deployment of the survival kit apparatus, the first survival kit package being normally positioned within the shell body at its end adjacent the tail cone;
      (ii) a second survival kit package comprising a second deflated, inflatable life raft, inflation means therefor actuable a predetermined time after the first survival kit package has left the shell body, and package means releasably enveloping the second life raft and inflation means, the second survival kit package being normally positioned within the shell body at its end near the nose cone;
      (iii) a rope deployment package normally positioned within the shell body between the first and second survival kit packages, the rope deployment package comprising a coil of buoyant rope of predetermined length, uncoilable from one end, a package means releasably enveloping a major portion of the rope coil, the end of the rope from which the rope coil is uncoiled being secured to the second life raft and the other end of the rope being secured to the first life raft.

2. An apparatus according to claim 1 further comprising a drogue parachute attached to the shell body and packaged within the shell body between the first and second survival kit packages and packaged as part of the rope deployment package.

3. An apparatus according to claim 2 further comprising a deflated, inflatable floatation means packaged in the shell body at the end adjacent the nose cone, the flotation means when inflated in operation to expand towards the open, tail cone end of the shell body to push any contents remaining in shell body out of the shell, the flotation means including inflation means for the floatation means.

4. An apparatus according to claim 3 further comprising means associated with the drogue parachute to actuate the inflation means for the flotation means when the drogue parachute leaves the shell body.

5. An apparatus according to claim 3 wherein the flotation means comprises an inflatable air bag.

6. An apparatus according to claim 2 wherein the aerodynamic brake means on the first survival kit package is releasably secured to the tail cone whereby release of the tail cone from secured position on the body of the shell, during operation, will cause the first survival kit package to be drawn out of the shell body by the aerodynamic brake means.

7. An apparatus according to claim 6 further provided with an lanyard secured to and extending between the aerodynamic brake means of the first survival kit and the inflation means for the first inflatable life raft, the lanyard to activate the inflation means on tension.

8. An apparatus according to claim 7 further comprising a deflated, inflatable floatation means packaged in the shell body at the end adjacent the nose cone, the flotation means when inflated in operation to expand towards the open, tail cone end of the shell body to push any contents remaining in the shell body out of the shell, the flotation means including inflation means for the floatation means, actuation means being mechanically associated with the drogue parachute to actuate that inflation means when the drogue parachute opens.

9. An apparatus according to claim 1 wherein the first and second survival kit packages each additionally comprise life saving and life support supplies.

10. An apparatus according to claim 1 wherein the shell body is of circular cross-section.

11. An apparatus according to claim 1 wherein ballast means is provided in the nose cone to provide a proper trajectory for the apparatus upon deployment from an airplane.

12. An apparatus according to claim 1 wherein the means to release the tail cone from secured position on the body of the shell is actuated a predetermined time after deployment of the apparatus from an airplane.

13. An apparatus according to claim 12 provided with a thruster mechanism normally securing the tail cone to the shell body, the thruster mechanism having a timer mechanism actuated upon deployment of the apparatus from the airplane to provide timed release of the tail cone from the shell body.

14. An apparatus according to claim 1 wherein a drogue parachute is secured to the outside of the tail cone, this drogue parachute being releasable upon deployment of the apparatus from an airplane after a certain period of time and operating to stabilize and properly orient the shell in a proper trajectory.

15. An apparatus according to claim 1, wherein the inflation means comprise compressed gas canisters.

16. An apparatus according to claim 1 wherein the aerodynamic brake means comprise parachutes.

17. An apparatus according to claim 1 wherein the aerodynamic brake means is normally positioned next to the first survival kit on the side adjacent the tail cone.

18. A method of air deployment of a pair of rope-joined life rafts to drop them in spaced positions on a body of water comprising the steps of:
(a) dropping from an airplane in a trajectory having a major horizontal component initially, over the body of water, a hollow container having a removable tail cone, the container containing a pair of rope-joined, deflated, inflatable life rafts;
(b) removing the tail cone and drawing one of the life rafts from the container;
(c) aerodynamically braking the descent of this life raft paying out the rope joining the two life rafts while the other life raft, still within the container, continuous its descent;
(d) removing the other life raft from the container; and
(e) inflating the life rafts as they reach the water surface.

19. A method according to claim 18 wherein the inflation of the first life raft is actuated when it is aerodynamic braked and wherein the container is aerodynamically braked in its descent after the first life raft is drawn from it, the inflation of the second life raft being commenced a predetermined time after commencement of the aerodynamic braking of the container, whereby the life rafts are being inflated shortly after the time of impact on the surface of the body of water.

20. A method according to claim 18 wherein the container is dropped at an altitude of between approximately 200 and 500 feet over the surface of the water.

* * * * *